United States Patent [19]
Nguyen et al.

[11] Patent Number: 5,454,089
[45] Date of Patent: Sep. 26, 1995

[54] BRANCH LOOK AHEAD ADDER FOR USE IN AN INSTRUCTION PIPELINE SEQUENCER WITH MULTIPLE INSTRUCTION DECODING

[75] Inventors: Truong Nguyen, Beaverton, Oreg.; Frank S. Smith, Chandler, Ariz.

[73] Assignee: Intel Corporation, Santa Clara, Calif.

[21] Appl. No.: 141,685

[22] Filed: Oct. 26, 1993

Related U.S. Application Data

[63] Continuation of Ser. No. 686,479, Apr. 17, 1991, abandoned.

[51] Int. Cl.⁶ .................................................. G06F 9/32
[52] U.S. Cl. .................. 395/375; 364/230.6; 364/255.1; 364/261.7; 364/DIG. 1; 364/931.4; 364/955; 364/938.2; 364/DIG. 2; 395/800; 395/421.03
[58] Field of Search .................................. 395/375, 400, 395/800

[56] References Cited

U.S. PATENT DOCUMENTS

| | | | |
|---|---|---|---|
| 4,714,994 | 12/1987 | Oklobdzija et al. | 364/200 |
| 4,777,587 | 10/1988 | Case et al. | 364/200 |
| 5,050,068 | 9/1991 | Dollas et al. | 364/200 |
| 5,088,030 | 2/1992 | Yoshida | 364/275 |
| 5,099,419 | 3/1992 | Nomura | 395/375 |
| 5,136,697 | 8/1992 | Johnson | 395/375 |

*Primary Examiner*—Ken S. Kim
*Attorney, Agent, or Firm*—Owen L. Lamb

[57] ABSTRACT

Logic examines signals from an instruction fetch unit to determine if the next instruction is a branch. A mux selects one of the 4 instruction words. MACRO [0:3] and a displacement from the selected word. A full adder (40) adds this displacement to the instruction pointer. The result is used as the branch address. The timing is such that a 1 clock lookahead is sufficient to hide this calculation from program execution. The branch register address is determined by the process ID and the macro mode state bit. The branch by pass mechanism causes the branch address to be driven from the calculation instead of a branch register. If a branch fail or scoreboard hit occurs, a write cancellation is generated to stop the current address calculation from being stored in a branch register. If a branch fail or scoreboard hit does not occur, then the current address calculation is stored in a branch register. If a branch bypass occurs, then the branch address is driven from the calculation. If a branch bypass does not occur, then the branch address is driven from the branch register.

6 Claims, 6 Drawing Sheets

FIG. 3

| VALBR0 | VALBR1 | VALBR2 | VALBR3 | BOPRDY | NXTBR | MAC0 | MAC1 | MAC2 | MAC3 |
|---|---|---|---|---|---|---|---|---|---|
| 1 | | | | 0 | 0 | | | | |
| 0 | 0 | | | 0 | 1 | B | B | | |
| 0 | 0 | | | 0 | 2 | R/M/u | R/M/u | B | |
| 0 | 0 | | | 0 | 3 | R/M/u | R/M/u | R/M/u | B |
| 1 | | | | 1 | | | | | |
| 0 | 1 | 0 | | 1 | 1 | B | B | | |
| 0 | 1 | 0 | | 1 | 2 | R/M/u | R/M/u | B | |
| 0 | 0 | 1 | | 1 | 2 | B | B | | |
| 0 | 0 | 1 | | 1 | 3 | R/M/u | R/M/u | R/M/u | B |
| 0 | 1 | 0 | 1 | 1 | 3 | R/M/u | B | B | B |
| 0 | 0 | 0 | 1 | 1 | 3 | R/M/u | R/M/u | B | B |

FIG. 4

|  | U0 | U1 | U2 | U3 | RDY | XLT 0 | CONST 1 | MACTAG 2 | MAC1X31 | NXTFLW | MAC0 | MAC1 | MAC2 | MAC3 |
|---|---|---|---|---|---|---|---|---|---|---|---|---|---|---|
| flw0a | 1 | | | | 0 | 0 | | | 0 | 0 | uM/uR | R | | |
| flw0b | 1 | | | | 0 | 1 | | | 1 | 0 | uM | C | | |
| flw1a | 0 | 1 | | | 0 | | | | | 1 | M/R | uR | | |
| flw1b | 0 | 1 | | | 0 | | | | | 1 | M/R | uM | | |
| flw1c | 0 | 1 | | | 0 | | 1 | | 0 | 1 | M/R | uM | | |
| flw1d | 0 | 1 | | | 1 | | | | 1 | 1 | u | uR | | |
| flw1e | 0 | 1 | | | 1 | | 1 | | 0 | 1 | u | uM | | |
| flw1f | 0 | 1 | | | 1 | | | | 1 | 1 | u | uM | | |
| flw2a | 0 | 0 | 1 | | 0 | | | | | 2 | R/M | R/M | C | |
| flw2b | 0 | 1 | 1 | | 1 | | | 1 | | 2 | u | u | | |
| flw2c | 0 | 0 | 1 | | 1 | | | | | 2 | R/M | R/M | C | |
| flw3a | 0 | 0 | 0 | 1 | 0 | | | | | 3 | R/M | R/M | R/M | u |
| flw3b | 0 | 0 | 0 | 1 | 1 | | | 1 | | 3 | R/M | u | u | u |
| flw3c | 0 | 0 | 0 | 1 | 1 | | | 1 | | 3 | R/M | R/M | R/M | u |
| flw3d | 0 | 0 | 0 | 1 | 1 | | | 1 | | 3 | u | R/M | R/M | u |

FIG. 5

BRANCH LOOK AHEAD ADDER FOR USE IN AN INSTRUCTION PIPELINE SEQUENCER WITH MULTIPLE INSTRUCTION DECODING

This application is a continuation of application Ser. No. 07/686,479 filed Apr. 17, 1991, now abandoned.

CROSS REFERENCES TO RELATED APPLICATIONS

This application is related to the following copending patent applications: "Register Scoreboarding Extended to all Multiple-cycle operations in a Pipelined Microprocessor", Ser. No. 07/486,407, filed Feb. 28, 1990, now issued U.S. Pat. No. 5,185,872; "Six-way Access Ported RAM Array Cell", Ser. No. 07/486,408, filed Feb. 28, 1990, now issued U.S. Pat. No. 5,023,844; "Data Bypass Structure in a Microprocessor Register File to Ensure Data Integrity", Ser. No. 07/488,254, filed Mar. 5, 1990, now abandoned; "An Instruction Decoder That Issues Multiple Instructions in Accordance with Interdependencies of the Instructions" Ser. No. 07/630,536, filed Dec. 20, 1990, now abandoned; "An Instruction Pipeline Sequencer with a Write-back Path", Ser. No. 07/630,535, filed Dec. 20, 1990, now abandoned.; A Microprocessor in Which Multiple Multicycle Operations Occur Concurrently" Ser. No. 07/630,499, filed Dec. 20, 1990 now abandoned; "Instruction Fetch Unit in a Microprocessor That Executes Multiple Instructions in One Cycle and Switches Program Streams Every Cycle" Ser. No. 07/630,498; filed Dec. 20, 1990, now abandoned; "An Instruction Decoder Having Multiple Alias Registers Which Provide Indirect Access in Microcode to User Operands" Ser. No. 07/630,497, filed Dec. 20, 1990, now issued U.S. Pat. No. 5,222,244; "A High Bandwidth Output Hierarchical Memory Store Including a Cache, Fetch Buffer and ROM" Ser. No. 07/630,534, filed Dec. 20, 1990, now issued U.S. Pat. No. 5,313,605; and, "Execution Interface Protocol" Ser. No. 07/630,496, filed Dec. 20, 1990, now abandoned, all assigned to Intel Corporation.

BACKGROUND OF THE INVENTION

1. Field of the Invention

The invention relates to data processing systems and more particularly to a method and apparatus for looking ahead in the instruction stream of a microprocessor for a branch instruction and for calculating the target address of the branch.

2. Description of the Related Art

The above referenced copending application Ser. No. 07/630,499 describes a Reduced Instruction Set Computer (RISC) that is a superscaler pipelined microprocessor wherein multiple functions are performed during each pipeline stage.

An Instruction Cache supplies an instruction sequencer with at least three instruction words per clock. The Instruction Sequencer decodes incoming instruction words from the Cache, and issues up to three instructions on a REG interface, a MEM interface and/or a branch logic within the Instruction Sequencer. The instruction sequencer includes means for detecting dependencies between the instructions being issued to thereby prevent collisions between instructions.

The above referenced copending application Ser. No. 07/630,535 describes an instruction sequencer that controls instruction execution by issuing Micro Addresses (UA)s each cycle, decides which instruction should be executed in the next cycle and handles Instruction pointer (IP) bookkeeping by gathering many boundary conditions from other units, makes guesses and then issues an instruction pointer in such a way that a preceding instruction will not see the change and the following instruction will, taking into account instruction pipelining, branch prediction and fail recovery, macro flow instruction lookahead, and other interdependent mechanisms.

A conditional branch instruction is a departure from the normal sequence of executing instructions that occurs if specified criteria are met. The branch is the set of instructions that are then executed up to the point that a decision instruction in the branch returns the execution to the instruction stream that was executing before the branch was taken.

It is an object of the present invention to provide a branch lookahead adder that will hide the execution time of a branch instruction by looking ahead in the instruction stream for branch instructions and then calculating the branch address.

SUMMARY OF THE INVENTION

The above object is accomplished in accordance with the invention by providing an apparatus for generating a branch address from a group of instructions and signals from an instruction fetch a branch address register. First means connected to the instruction fetch unit examine the signals from the instruction fetch unit to determine if a next instruction in the group of instructions is a branch instruction, the next instruction being pointed to by an instruction pointer. Second means connected to the first means extracts a displacement from the next instruction. An adder connected to the instruction pointer and to the second means adds the displacement to the instruction pointer to thereby get a current address calculation at an output of the adder. Third means connected to the output of the adder generates a write cancellation to stop the current address calculation from being stored in a branch register if a branch fail or scoreboard hit occurs. Fourth means connected to the output of the adder stores the current address calculation in a branch register if a branch fail or scoreboard hit does not occur.

In accordance with an aspect of the invention the apparatus is further provided with fifth means for driving the branch address from the calculation if a branch bypass occurs; and, sixth means for driving the branch address from the branch register if a branch bypass does not occur.

BRIEF DESCRIPTION OF THE DRAWINGS

The foregoing and other objects, features, and advantages of the invention will be apparent from the following more particular description of a preferred embodiment of the invention as illustrated in the accompanying drawings.

FIG. 3 is a table illustrating how the Next Logic of FIG. 2 generates the NXTBR [0:3] signal;

FIG. 4 is a table illustrating how the Next Logic of FIG. 2 generates the NXTFLW [0:3] signal;

FIG. 5 is a table illustrating how the PLA1 Logic of FIG. 2 generates the NXTBOP signal and, FIGS. 6 and 7 each comprise a flow chart of the method of operation of the invention.

DESCRIPTION OF THE PREFERRED EMBODIMENT

Figure 1:
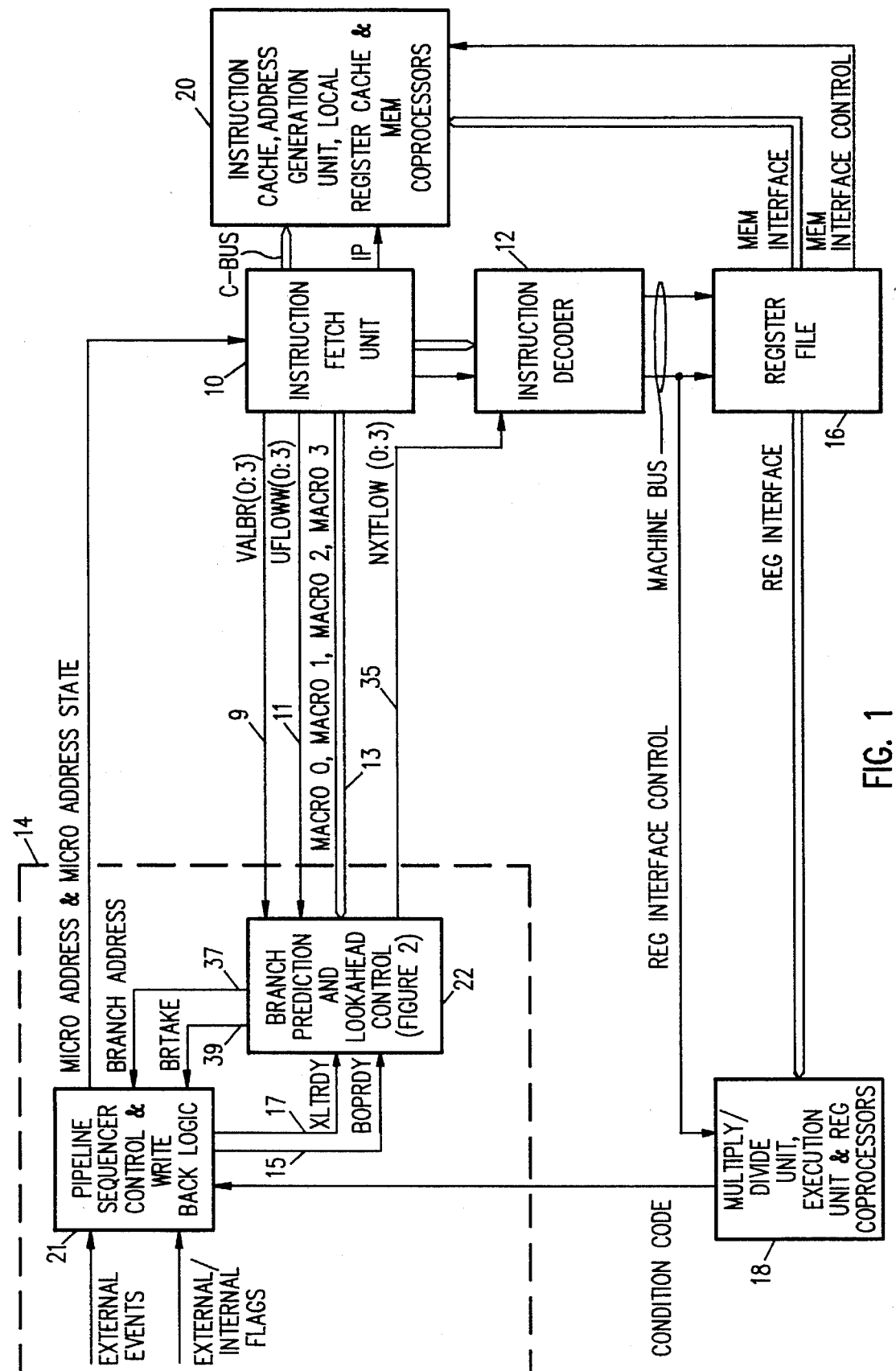
FIG. 1 is a functional block diagram of each of the major components of the microprocessor in which the invention is embodied.

As shown in FIG. 1, the microprocessor in which the present invention is embodied is comprised of Instruction Fetch Unit (10), Instruction Decoder (12), Pipeline Sequencer (14), shown within the broken lines, Register File (16), Multiply/Divide Unit, Execution Unit, and REG coprocessors block (18) and instruction cache, Address Generation Unit, local register cache, and MEM coprocessors block (20). These units are briefly described below. For more detailed information about each of these units refer to the above-identified copending applications. The Pipeline Sequencer (14) is comprised of pipeline sequencer control and write back logic (21) and Branch Prediction and Lookahead Control (22). The Branch Prediction and Lookahead Control (22) is the block in which the present invention is embodied and is shown in more detail in FIG. 2.

The Instruction Cache (20) provides the Instruction fetch unit (10) with four instructions every cycle over the macro Bus (13).

The instruction sequencer (IS) includes the Fetch Unit (IFU-10), the Instruction Decoder (ID-12) and the Pipeline Sequencer (PS-14). This instruction sequencer decodes the incoming four instruction words. It can decode and issue up to three instructions per clock but it can never issue more than four instructions in two clocks. The IS decodes the instruction stream and drives the decoded instructions onto the machine bus.

The Register File (RF-16) has 16 local and 16 global registers. The RF has 4 independent read ports and 2 independent write ports to support the machine parallelism.

Execution Unit and Multiply-Divide Unit block (18) performs all the simple integer and ordinal operations and integer/ordinal multiply, divide, remainder, and modulo operations of the microprocessor in which the present invention is embodied.

The Address Generation Unit (AGU) and Local Register Cache (LRC) within the block (20) do the effective address calculations in parallel with the integer execution unit and maintains a stack of multiple 16-word local register sets.

Throughout this specification state, machine cycles, and instructions are referred to as being the previous, current, or next. The view point is that of the Instruction Pointer in Pipe 0. For example, the previous instruction is the one leaving the instruction decoder during clock 1, phase 1 (q11) on its way to the Execution Unit (18) or Memory Interface (20); the current instruction is the one being fetched out of the Cache or Microcode ROM during clock 0, phase 2 (q02); and finally the next instruction is the one that will be fetched based on the next address decision made in the current state (pipe 0).

Instruction Pipeline Sequencer

The Pipeline Sequencer Control and Writeback Logic (21) is described more fully in copending application Ser. No. 07/630,535. The Pipeline Sequencer (14) controls instruction execution by issuing Micro Addresses (UA)s each cycle. Two memory spaces are defined, main memory space and microcode memory space. In addition to the two memory spaces two modes of operation are defined: Micro and Macro mode. In Micro mode the system executes a superset of RISC instructions and has access to 32 scratch registers in addition to the user's global and local registers. In Macro mode the machine will execute only specific architecture compatible instructions and will generate opcode invalid faults on all others.

The Pipe Sequencer (PS) decides which instruction should be executed in the next cycle and handles Instruction pointer (IP) bookkeeping.

The pipe sequencer gathers many boundary conditions from other units, analyses them carefully, makes guesses and then issues an IP. This IP can be wrong because of wrong guessing, so an elaborate scheme of machine state and pipeline manipulation is provided in the PS as described in copending application Ser. No. 07/630,535.

The Branch Prediction and Lookahead Control Logic (22), attempts to hide the execution time of a branch, which is a minimum of two cycles, by looking ahead a maximum of four words in the instruction stream for branching instructions. If the logic encounters a branch instruction within that four word window, it calculates the target address of the branch and causes the next four words to be prefetched accordingly.

Figure 2:
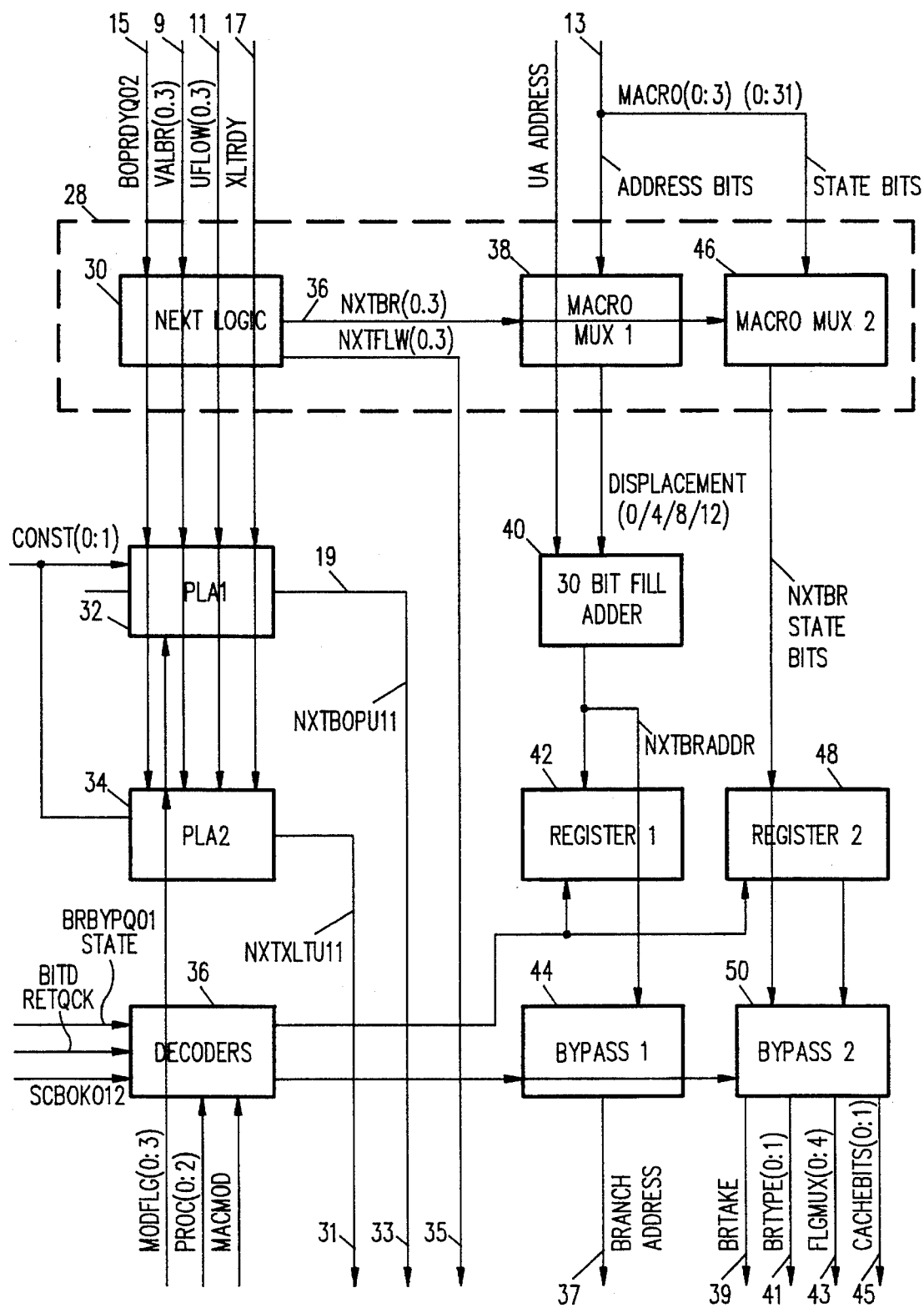
FIG. 2 is a block diagram of the Branch Prediction and Lookahead Control Logic (22) shown in FIG. 1.

FIG. 2 is a block diagram of the Branch Prediction and Lookahead Control Logic (22), which consists of the following closely coupled units:

Next Branch Mux (28)

PLA 1 Nxtbop Generator (32)

PLA 2 Nxtxlt Generator (34)

30 Bit Full Adder (40)

Branch Registers (42, 48)

Bypass Logic (44, 50)

Constant Bus Control decoders (36)

The branch prediction and lookahead control logic (22) receives information from the instruction fetch unit (IFU-10) in q02 and decodes it for the following information:

Where is the next branch [NXTBR(0:3)]?

Is the next instruction a branch instruction [NXTBOP]?

Will the next instruction be executed in the next cycle?

The last question is in essence answered by the Pipeline Sequencer and Control Logic (21) which is described in copending application Ser. No. 07/630,535.

Next Branch Logic

The Next Branch Logic (28) is comprised of three blocks, the next logic (30), macro MUX 1 (38) and macro MUX 2 (46).

The Next Branch Logic receives the following signals which are used to answer the first question: where is the next branch?

VALBR[0:3]: These signal lines (9) from the instruction fetch unit IFU indicate that an instruction is a branch instruction, e.g. RISC branch, CMPBR, call etc. For example, if VALBR0 (9) is asserted then it means that the MACRO0 bus (13) has a branch instruction on it. The branch prediction and lookahead control logic (22) receives these predecoded bits from the instruction fetch unit in q02.

BOPRDY: Branch Operation Ready line (15) indicates that the branch address has been calculated and a branch can be executed during this cycle. The branch prediction and lookahead control logic (22) receives this signal from the pipeline sequencer control and write back logic (21).

MACRO (0:3): this Macro bus (13) carries four predecoded 32-bits macroinstruction words called MACRO0, MACRO1, MACRO2, and MACRO3. The branch prediction and lookahead control logic (22) receives this bus from the instruction fetch unit (10).

NXTBR[0:3 ]: The next logic (30) determines from its inputs which part of the macro bus (13) has the next branch instruction on it and generates the appropriate NXTBR[0:3 ] signal which is supplied to the Macro MUX 1 (38) and the Macro MUX 2 (46). If, for example, VALBR0 (9) is asserted and Boprdy (15) is not then the next branch is on the macro0 portion of the macro bus (13). However if VALBR0 (9) is asserted and Boprdy (15) is also asserted, then NXTBR0 cannot be asserted. This is because the lookahead is always looking at the instruction past the first one and hence the address of the first branch has already been calculated.

Refer now to the table of FIG. 3 for an understanding of the conditions under which the NXTBR[0:3] signal (37) is generated. In the table of FIG. 3, B=Branch, R=Reg, M=Mem, and u=uR/uM (where uR=Micro Flow Reg and uM=Micro Flow Mem).

The meaning of the first four rows follows from the above explanation and the definition of VALBR[0:3] and Boprdy. To help understand the next six rows two examples are discussed below:

EXAMPLE 1

A: Reg
B:bX
C:bY

Assume instruction execution is at instruction A and the BOPRDY line is asserted. Since the logic looks ahead past the first instruction, the address X is already calculated while at A and hence the next branch that needs to be ready is for instruction C (which is NXTBR2).

EXAMPLE 2

A:bX
B: Reg
C: Mem
D:bY

In this example, when instruction execution is at instruction A and BOPRDY is asserted, it is known that the address X has already been calculated and hence the logic must be ready for the next branch at instruction D (which is NXTBR3). It should now be clear that the BOPRDY is due to the last branch.

Next Flow Logic

The Next Flow Logic blocks (30, 38, 46) receive four predecoded 32 bit macroinstruction words called MACRO0, MACRO1, MACRO2, and MACRO3, and four predecoded microflow bits (11) FLOW [0:3], namely, UFLOW0, UFLOW1, UFLOW2, and UFLOW3 from the instruction fetch unit. The NXTFLW[0:3] logic (30) determines which macro bus has the next micro flow instruction. If UFLOW1 is asserted then MACRO1 has the next micro flow instruction. The NXTFLW [0:3] signals (35) are used as MUX controls on the XROM inputs in the instruction decoder (ID) described in copending applications Ser. No. 07/630,536 and Ser. No. 07/630,497.

Refer now to the table of FIG. 4 for an understanding of the conditions under which the NXTFLW[0:3] signals (35) are generated. In the table of FIG. 4 C=Constant, R=Reg, M=Mem, uR=Micro Flow Reg, and uM=Micro Flow Mem.

To help understand the table of FIG. 4, some examples are discussed below:

EXAMPLE 3

Referring to FIG. 4, flw1c row, the following conditions are represented:

| | | |
|---|---|---|
| UFLOW0 | = 0 | ===> MACRO0 is a R/M type instruction |
| UFLOW1 | = 1 | \| |
| | | \|===> MACRO1 is a uM type instruction |
| MACRO1X31 | = 1 | \| |
| CONST1 | = 1 | ===> MACRO2 is a constant |
| MACTAG2 | = 1 | ===> MACRO2 is a valid bit |
| XLTRDY | = 0 | |

The above conditions correspond to the following sequence of instructions:

A:R/M
B:uM

In this example, when at instruction A, the logic can look ahead and start translating instruction B, which is a micro flow instruction. Thus it is not necessary that XLTRDY (17) be asserted and the next flow is at B (which is NXTFLW1).

EXAMPLE 4

Referring to FIG. 4, flw3c row, the following conditions are represented:

| | |
|---|---|
| UFLOW0 = 0 | ===> MACRO0 is a R/M type instruction |
| UFLOW1 = 1 | ===> MACRO1 is a micro flow type instruction |
| UFLOW2 = 0 | ===> MACRO2 is a R/M type instruction |
| UFLOW3 = 1 | ===> MACRO3 is a micro flow type of instruction |
| XLTRDY = 1 | |

The sequence of instructions in this case is as follows:
A:R/M
B:uF
C:R/M
D:uF

In this case, since XLTRDY (17) is asserted, the branch prediction and lookahead control logic (22) looks ahead while at instruction A and starts translating instruction B. Hence the next flow, in this case, is at D (which is NXTFLW3).

PLA 1 Nxtbop and PLA 2 Nxtxlt Generator

To answer the second question (Is the next instruction a branch instruction?), some more signals need to be looked at:

UFLOW[0:3]: These signals (11) Indicate that an instruction is a macro flow instruction, e.g. Extract, modify, call etc. Hence if UFLOW1 is asserted then it implies that MACRO1 is a micro flow type of instruction. Depending upon other conditions, this micro flow instruction could either be micro flow reg, or micro flow mem, or micro flow branch type of instruction. The branch prediction and lookahead control logic (22) receives these predecoded signals from the instruction fetch unit in q02.

XLTRDY: This signal (17) indicates that the macro flow lookahead logic has found and translated a macro flow instruction and the instruction can execute in this state.

REG[0:1]: When asserted, indicates that the respective instruction is a REG format instruction. If REG0 is asserted then it indicates that MACRO0 is a REG type instruction and if REG 1 is asserted then it indicates that MACRO1 is a REG type instruction.

MEM[0:2]: Indicates that the respective instruction is a MEM format instruction. If MEM0 is asserted then it indicates that MACRO0 is a MEM type instruction, if MEM1 is asserted then it indicates that MACRO1 is a MEM type instruction and if MEM2 is asserted then it indicates that MACRO2 is a MEM type instruction.

CONST[0:1]: Indicates that an instruction has a 32 bit constant after it. So if CONST0 is asserted it implies that instruction 0 needs a constant, which is MACRO1, and if CONST1 is asserted it implies that instruction 1 needs a constant, which is MACRO2.

The NXTBOP signal (19) from PLA 1 (32) helps in determining whether the next instruction is a branch instruction. If a valid branch is seen in the instruction stream then NXTBOP will be asserted and the Branch Lookahead logic will start calculating the target address in order to be ready for the Pipe Sequencer to branch. The PLA1 logic examines the 4 words coming from the instruction fetch unit in q02

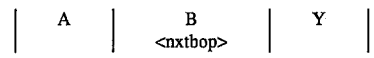

The branch calculation is transparent and the instructions execute in sequence. However, if there is a process change, for example, after the instruction B, then the lo sequence will be as shown below:

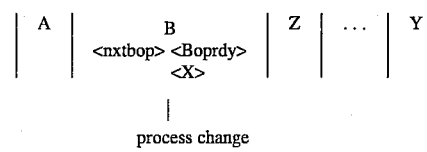

In the above example, when at instruction A, the logic looks ahead and sees the branch instruction at C. The address Y is already calculated when the process switch happens after instruction B. Once the machine returns from the process switch the instruction flow goes to Y, since it is already on the write back path. Consider now the same example, but wherein the process switch happens after instruction A.

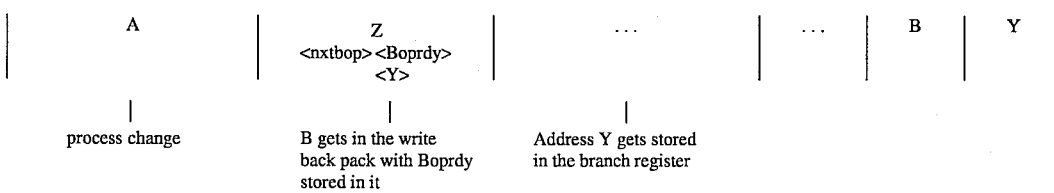

and asserts the NXTBOP signal if it finds a branch instruction in the next executable cycle.

NXTBOP is asserted only if the next cycle will execute a branch. This does not mean the next cycle in time but the next cycle of the current instruction sequence which may not happen immediately but may be delayed due to a process switch, DMA interrupt etc. The generation of the NXTBOP signal does not mean that the branch will happen in the next cycle. It is just an information to be stored in the state of the next address and if by chance, the next address is chosen in the next cycle, then the branch will occur. If not then the next address will be put into the write back path and flows toward the UA stack.

The following example will clarify the above description.

EXAMPLE 5

A: crop (this comparison sets the condition code & the branch is seen here)
B: REG
C:bY As should be apparent from the above example, the generation of NXTBOP doesn't mean that the branch will happen in the next cycle.

The generation of NXTBOP is explained with reference to the table shown in FIG. 5 wherein B=Branch, R=Reg (e.g. cmp, mul, add), M=Mem (e.g. st, ld), uR=Micro Flow Reg (e.g. extract, modify, movq), uB=Micro Flow Branch (e.g. bal, call), uM=Micro Flow Mere (e.g. balx, callx, lda (base)+disp) and, Cnst=Constant.

Figure 5:
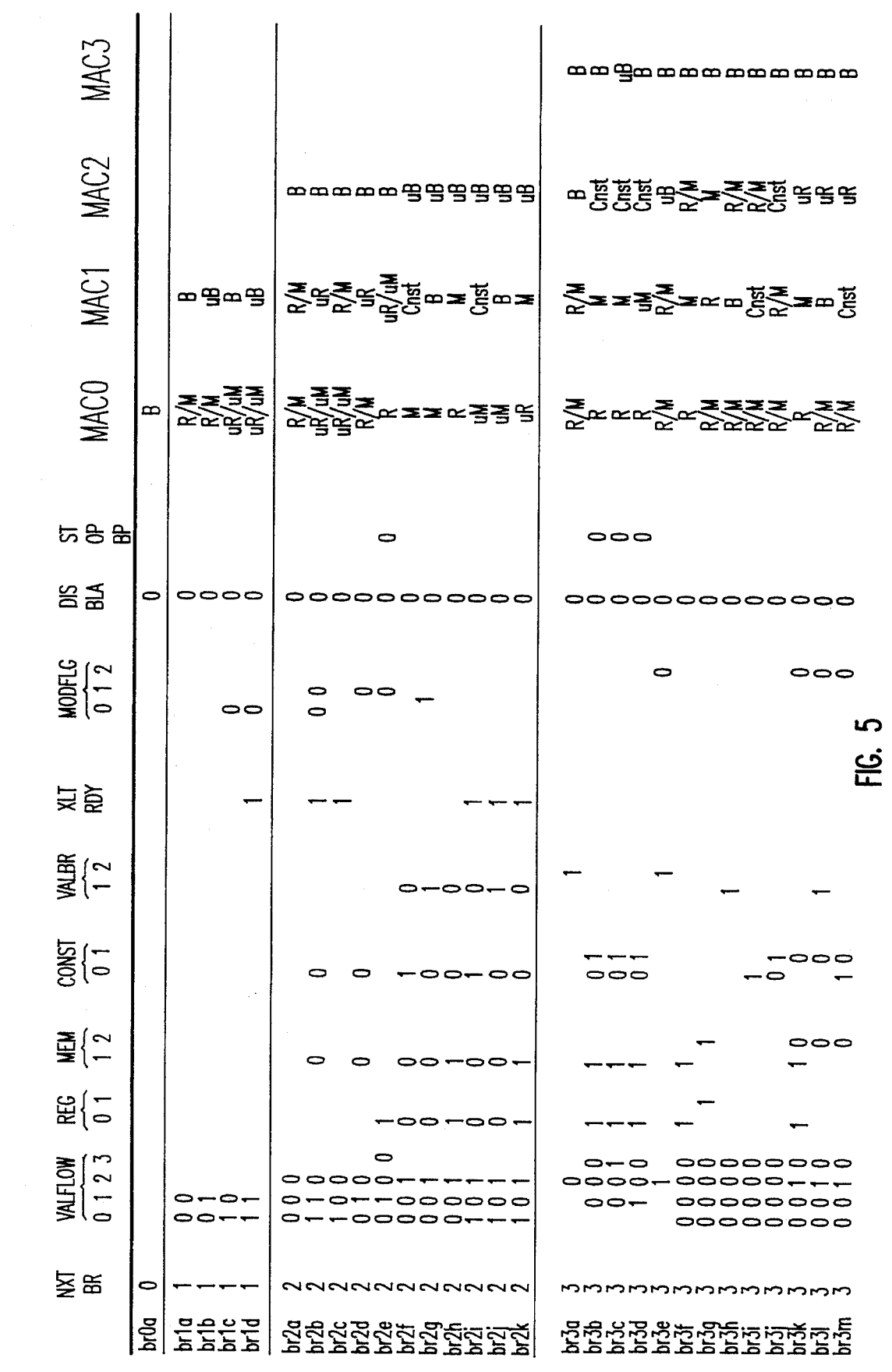

The following examples are taken from the table of FIG. 5 to explain the generation of the NXTBOP signal:

EXAMPLE 6

Referring to FIG. 5, row br1c, the following conditions are represented for br1c:
VALFLOW0=1
VALFLOW1=0
XLTRDY=don't care
A:uR/uM
B:b In the above case when at A, the logic can look ahead and see the branch at A. It doesn't matter in this example whether XLTRDY is asserted or not, since B is a simple branch operation, and hence doesn't need to be translated.

Referring to FIG. 5, row br1d, the following conditions are represented for br1d:

VALFLOW0=1
VALFLOW1=1
XLTRDY=1
A:uR/uM
B:uB

In this case, when at A, it is necessary that XLTRDY be asserted before looking ahead. This is because A and B are both micro flow instructions and the logic cannot look ahead past A because it needs to translate A first before being able to translate B. Hence in this case, XLTRDY needs to be asserted.

EXAMPLE 7

Referring to FIG. 5, row br2b, the following conditions are represented:

```
VALFLOW0   = 1    = = = > Macro0 is a uR/uM
VALFLOW1   = 1    |
                  | = = = > Macro1 is a uR
MEM1       = 0    |
VALFLOW2   = 0    |
                  | = = = > Macro2 is a uB
NXTBR2     = 1    |
XLTRDY     = 1
```

For the above example there is the following sequence of instructions:

A:uF (uR/uM)
B:uR
C:uB

Consider the following sequence of instructions with respect to an example related to the above example:

A:uR
B:uM
C:bY

In this case, when at A, no purpose is served by the logic looking ahead. This is because a micro flow mem type of instruction basically consists of 3 operations executed in sequence.

uM: memory cycle (e.g. lda)
    xltrdy cycle
    ucode

So one cycle is spent in the memory cycle before translation is possible.

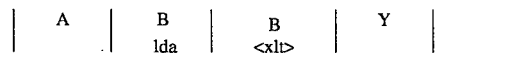

Hence if a uR is followed by a uM type of instruction then there is no point in looking ahead because one cycle is needed for the memory cycle before translation is possible.

Going back to the previous example:

A:uF (uR/uM)
B:uR
C:uB

If A is a uM type of instruction and B is a uR type of instruction, then when at A, the logic will still look ahead and start translating the next instruction at B. This is because a micro flow reg type instruction, unlike the micro flow mem type of instruction, does not have a memory cycle before the xltrdy cycle. Hence translation for instruction B can start while at A.

30 Bit Full Adder, Branch Registers, Bypass Logic

The following section explains the operation of the 30 Bit Full Adder, the Branch Registers, and the Bypass Logic blocks as a single unit. The branch prediction and lookahead control logic (22) calculates the target address from the current micro address, the branch displacement, and the position of the branch instruction with respect to the instruction pointer (whether it appears on MACRO0, MACRO1, etc.). Each cycle, the macro mux block in q11 will select 1 of the 4 instruction words then extract a displacement from it. The full adder (40) then in q12 adds this displacement to the instruction pointer. The result will be ready by the end of q12 to be used as the branch address. The timing is such that a 1 clock lookahead is sufficient to hide this calculation from program execution.

The branch prediction and lookahead control logic (22) has 8 registers, one for each DMA process (4) and two for each user process (one for macro mode and one for micro mode). The branch register address is determined by the process ID and the macro mode state bit. The branch "bypass" mechanism allows the branch address to be driven from the q12 calculation instead of a branch register. Write cancellation stops the current address calculation from being stored in a branch register. This is done for a branch fail or scoreboard bit to prevent the overwriting of a valid target address.

The following example illustrates the writing of the branch registers.

EXAMPLE 8

A:Reg
B:Reg
C:bX
D:bY

Ideally the above instructions will execute sequentially as shown below:

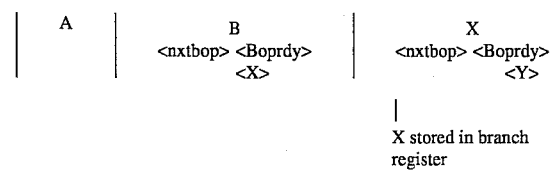
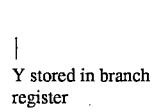

Now suppose that there is a scoreboard due to A. In this case the following sequence of instructions will pertain:

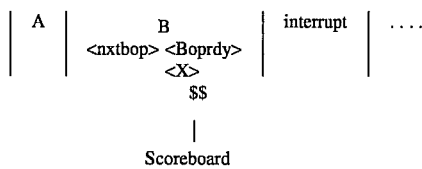

Scoreboard

When the scoreboard due to A is removed, the following sequence of instructions will pertain:

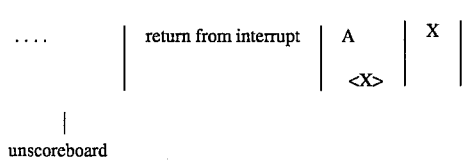

unscoreboard

In this case X will not be written in the branch register when the machine gets scoreboarded. This is because when the machine gets unscoreboarded it will return to A (which was in the write back path) and address X will be calculated again.

State Bits

There are 10 state bits calculated by the branch prediction and lookahead control logic (22). These are BRTAKE, BRTYPE[0:1], FLGMUX[0:4], and CACHEBITS[0:1].

BRTAKE: The Branch take bit determines whether the machine will guess to "take" or "not to take" a branch while waiting for the flags to arrive. If the BRTAKE bit is wrong, the pipe sequencer will guess wrong and take a cycle hit in performance. The BRTAKE bit decodes as follows:

| | |
|---|---|
| 0 | predict "do take the branch" |
| 1 | predict "do not take the branch" |

BRTYPE[0:1]: These two bits are the lower 2 bits of BRCOM and determine the type of branching instruction to be performed. This field is always 0 for macro risc, but can decode as follows in micro-mode:

| | |
|---|---|
| 00 | RISC Branch |
| 01 | Micro Return |
| 10 | Micro Call |
| 11 | — |

FLGMUX[0:4]: The FLGMUX bits determine which of the 32 flags to use for a conditional branch. The FLGMUX bits decode as follows:

| | |
|---|---|
| 00000–00111 | user defined flags |
| 01000–01011 | always asserted (unconditional branch) |
| 01100–01111 | user defined flags |
| 10000 | unordered condition code |
| 10001 | greater condition code |
| 10010 | equal condition code |
| 10011 | greater or equal condition code |
| 10100 | less condition code |
| 10101 | not equal condition code |
| 10110 | less or equal condition code |
| 10111 | ordered condition code |
| 11000–11110 | user defined flags |
| 11111 | never asserted (don't branch) |

CACHEBITS[0:1]: Unlike the other branch state bits, the cache bits are not stored in the branch registers. They are modified by the branch prediction and lookahead control logic (22) and sent to the PS to become part of the branch state. The cache bits determine the cache access mode.

Constant Bus Control

The constant bus is the main data path between the instruction sequencer (IS) and the execution unit (EU). This 32 bit path communicates between the IS and the EU. It is used to transfer offsets and displacements to the EU as well as RISC effective addresses. The effective address of a memory operation will be on the constant bus when a delayed branch is executed.

The branch prediction and lookahead control logic (22) drives the constant bus in two different cases. In phase 1, the logic can drive the current or next micro address for a fetch operation. In phase 2, the logic can drive a displacement or offset to the address generation unit (AGU) from the macro lines for effective address calculations. There are four phase 1 and four phase 2 cases for driving the constant bus:

| Phase 1 | Curfet | Curfet# |
|---|---|---|
| Long Fetch: | uaddr [3:31] | nxtblk [3:31] |
| 4 Wd Fetch: | uaddr [4:31] | nxtblk [4:31] |
| Phase 2 | MEMA | MEMB |
| mem0: | MACRO0 [0:11] | MACRO1 [0:31] |
| mem1: | MACRO1 [0:11] | MACRO2 [0:31] |

Logic Flow Description

Figure 6:
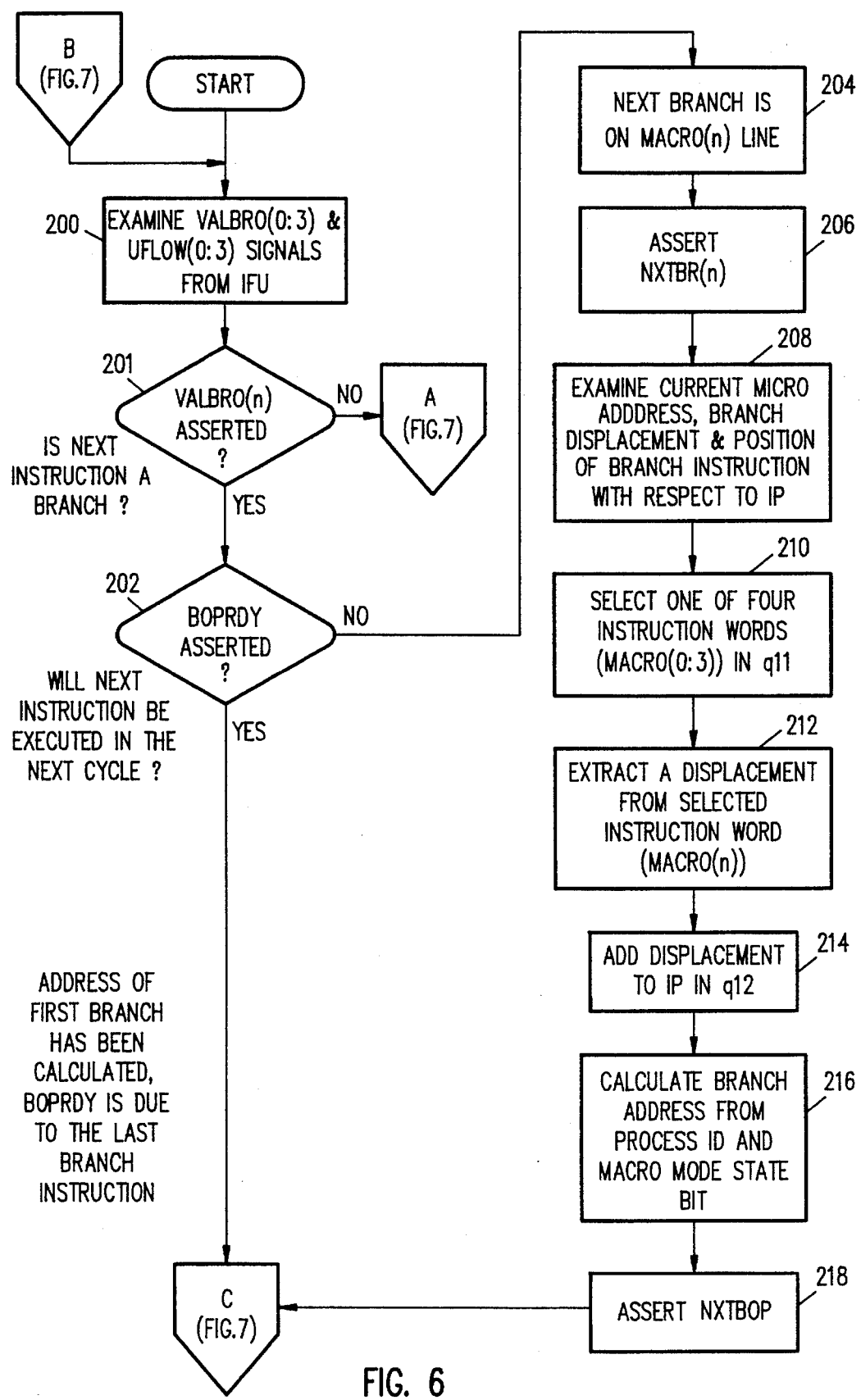
Figure 7:
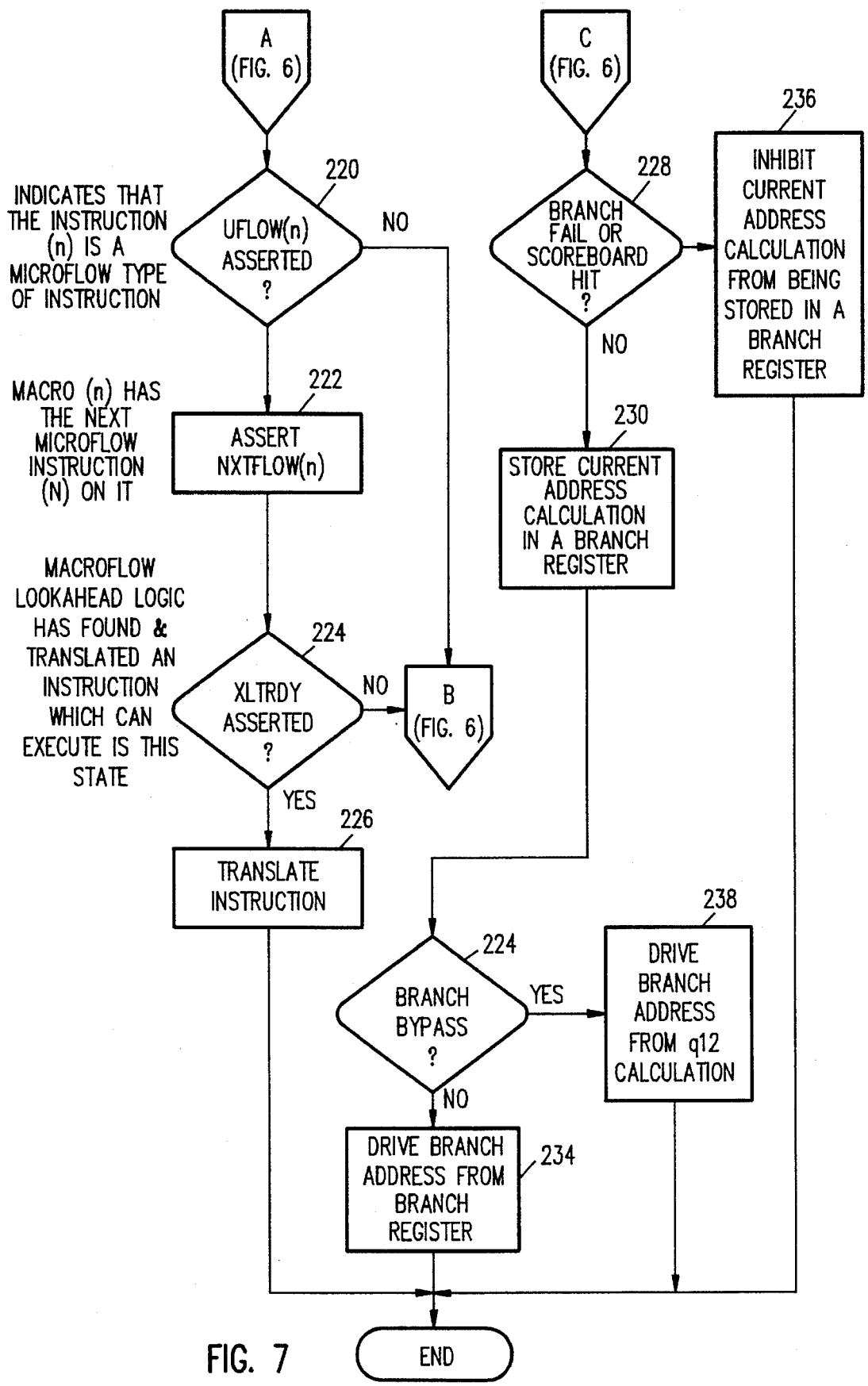

Refer to FIGS. 6 and 7, which together make up a flow diagram of the method of determining the branch address. At block (200) the logic examines the VALBRO[0:3] and the UFLOW[0:3] signals from the instruction fetch unit to determine if the next instruction is a branch as indicated by the assertion (201) of one of the VALBRO[0:3] lines. If VALBRO is asserted, then this is a branch instruction. If BOPRDY is asserted, then it is known that the first branch address has already been calculated, and the flow proceeds to FIG. 7. If BOPRDY is not asserted, then it is known that the first branch address must be calculated. The next branch instruction is on the MACRO[n] bus indicated by the VALBRO[n] line that is asserted. The logic asserts (206) one of the NXTBR[0:3] signals NXTBR[n] to indicate which bus has the next branch on it. The macro mux block in q11 selects (210) one of the 4 instruction words, MACRO [0:3]. The macro mux block extracts a displacement from the selected word (block 212). The full adder (40) in q12 adds this displacement to the instruction pointer with the result ready at the end of q12 (block 214). The result is used as the branch address. The timing is such that a 1 clock lookahead is sufficient to hide this calculation from program execution. The branch register address is determined by the process ID and the macro mode state bit. The branch by pass mechanism (block 232) causes the branch address to be driven from the q12 calculation instead of a branch register (238). If a branch fail or scoreboard hit occurs (228), a write cancellation is generated to stop the current address calculation from being stored in a branch register (236). If a branch fail or scoreboard hit does not occur (228), then the current address calculation is stored in a branch register (230). If a branch bypass occurs, then the branch address is driven from the q12 calculation. If a branch by pass does not occur, then the branch address is driven from the branch register.

Referring again to FIG. 6, block (210), if VALBRO is not asserted, then this is not a branch instruction and the flow continues on FIG. 7, block (220). At block (220) the logic examines the UFLOW[0:3] signals from the instruction fetch unit to determine if the next instruction is a microflow type of instruction as indicated by the assertion (220) of one of the UFLOW[0:3] lines. The logic asserts one of the NXTFLOW[0:3] lines NEXTFLOW[n] to indicate which bus has the next instruction on it. If XLTRDY is asserted (224) then the instruction can be translated (226). If XLTRDY is not asserted (224) then the flow returns to FIG. 6.

While the invention has been particularly shown and described with reference to preferred embodiments thereof, it will be understood by those skilled in the art that the foregoing and other changes in form and detail may be made therein without departing from the scope of the invention.

What is claimed is:

1. A method of generating a branch target address comprising steps of:

(A) receiving four macroinstruction words MACRO0, MACRO1, MACRO2, and MACRO3;

(B) receiving four valid branch lines VALBR0, VALBR1, VALBR2, and VALBR3, a particular one of said four valid branch lines being asserted indicating which corresponding one of said four macroinstruction words is a next branch instruction;

(C) receiving a branch operation ready line BOPRDY, said BOPRDY being asserted indicating that a previous branch target address associated with a previous branch instruction has been calculated and stored in a branch register;

(D) determining from said four valid branch lines VALBR0, VALBR1, VALBR2, and VALBR3 which one of said four macroinstruction words MACRO0, MACRO1, MACRO2, and MACRO3 is said next branch instruction;

(E) asserting one of four next branch lines NXTBR0, NXTBR1, NXTBR2, and NXTBR3, upon a condition that said BOPRDY is not asserted, one of said next branch lines being asserted indicating which corresponding one of said four macroinstruction words MACRO0, MACRO1, MACRO2, and MACRO3 is determined to be said next branch instruction;

(F) receiving a scoreboard hit (SCBOK) signal, said SCBOK signal being set or not set, (G) selecting a one instruction from said four macroinstruction words MACRO0, MACRO1, MACRO2, and MACRO3 whose next branch line of said lines NXTBR0, NXTBR1, NXTBR2, and NXTBR3, is asserted, indicating that said one instruction is said next branch instruction;

(H) extracting a displacement value from said one instruction;

(I) generating a branch target address at an adder output by adding said displacement value to an instruction pointer;

(J) storing said branch target address in said branch register upon a condition that said SCBOK is set; and, (K) preventing an overwriting, with said branch target address associated with said next branch instruction, of said valid branch target address associated with a previous branch instruction stored in said branch register, upon a condition that said SCBOK is not set.

2. The method in accordance with claim 1 further comprising steps of:

(L) receiving a branch bypass signal;

(M) obtaining said next branch target address from said adder output upon the condition that said branch bypass signal is asserted; and, (N) obtaining said next branch target address from said branch register upon the condition that said branch bypass signal is unasserted.

3. An apparatus for generating a branch address, said apparatus comprising:

first bus means for receiving four macroinstruction words MACRO0, MACRO1, MACRO2, and MACRO3;

second bus means for receiving four valid branch lines VALBR0, VALBR1, VALBR2, and VALBR3, a particular one of said four valid branch lines being asserted indicating which corresponding one of said four macroinstruction words is a branch instruction;

a branch register;

a branch operation ready line BOPRDY, said BOPRDY being asserted indicating that a previous branch target address associated with a previous branch instruction has been calculated and stored in said branch register;

next logic means connected to said first bus means, said second bus means and said BOPRDY, for determining from said four valid branch lines VALBR0, VALBR1, VALBR2, and VALBR3 which one of said four macroinstruction words MACRO0, MACRO1, MACRO2, and MACRO3 is a next branch instruction;

said next logic means including four next branch lines NXTBR0, NXTBR1, NXTBR2, and NXTBR3, one of said next branch lines being asserted by said next logic means, upon a condition that said BOPRDY is not asserted, to indicate which corresponding one of said four macroinstruction words is said next branch instruction;

a branch address register;

an instruction pointer;

extracting means connected to said next logic means for extracting a displacement value from said one instruction;

adder means connected to said instruction pointer and to said extracting means for adding said displacement value to said instruction pointer to thereby generate a next branch target address at an output of said adder;

a scoreboard hit (SCBOK) signal, said SCBOK signal being set or not set;

storing means connected to said output of said adder for storing said next branch target address in said branch register upon a condition that said SCBOK signal is set, and, inhibiting means connected to said output of said adder for preventing an overwriting, with said next branch target address, of a previous branch target address associated with a previous branch instruction stored in said branch register, upon a condition that said SCBOK signal is not set.

4. The apparatus in accordance with claim 3 further comprising:

a branch bypass signal;

bypass logic means for obtaining said next branch target address from said output of said adder upon a condition that said branch bypass signal is asserted; and, register logic means for obtaining said next branch target address from said branch register upon a condition that said branch bypass signal is unasserted.

5. An apparatus for generating a branch address said apparatus comprising:

a first bus of four macroinstruction words MACRO0, MACRO1, MACRO2, and MACRO3;

a second bus of four valid branch lines VALBR0, VALBR1, VALBR2, and VALBR3, a particular one of said four valid branch lines being asserted indicating which corresponding one of said four macroinstruction words is a branch instruction;

a branch register;

a branch operation ready line BOPRDY, said BOPRDY being asserted indicating that a previous branch target address associated with a previous branch instruction has been calculated and stored in said branch register;

a next logic connected to said first bus, said second bus and said branch operation ready line, said next logic determining from said four valid branch lines VALBR0, VALBR1, VALBR2, and VALBR3 which one of said four macroinstruction words MACRO0, MACRO1, MACRO2, and MACRO3 is a next branch instruction;

four next branch lines NXTBR0, NXTBR1, NXTBR2, and NXTBR3, one of said next branch lines being asserted by said next logic, upon a condition that said BOPRDY is not asserted, to indicate which corresponding one of said four macroinstruction words is said next branch instruction;

a branch address register;

an instruction pointer;

a macro mux connected to said next logic for extracting a displacement value from said one instruction;

an adder connected to said instruction pointer and to said macro mux for adding said displacement value to said instruction pointer to thereby generate a next branch target address at an output of said adder;

a scoreboard hit (SCBOK) signal, said SCBOK signal being set or not set;

first logic connected to said output of said adder for storing said next branch target address in said branch register upon a condition that said SCBOK signal is set, and, second logic connected to said output of said adder for preventing an overwriting, with said next branch target address, of a previous branch target address associated with a previous branch instruction stored in said branch register, upon a condition that said branch said SCBOK signal is not set.

6. The apparatus in accordance with claim 5 further comprising:

a branch bypass signal;

a bypass logic that obtains said next branch target address from said output of said adder upon a condition that said branch bypass signal is asserted; and, a register logic that obtains said next branch target address from said branch register upon a condition that said branch bypass signal is unasserted.

* * * * *

UNITED STATES PATENT AND TRADEMARK OFFICE
CERTIFICATE OF CORRECTION

PATENT NO.  : 5,454,089

DATED       : September 26, 1995

INVENTOR(S) : Nguyen, et al.

It is certified that error appears in the above-identified patent and that said Letters Patent are hereby corrected as shown below:

Abstract, line 3, change "words." to -- word, --;
Column 8, line 9, change "the lo" to -- the --;
Column 8, line 58, change "brlc" to -- br1c --;
Column 7, line 63, "crop" should read --Cmp--.

Signed and Sealed this

Eighteenth Day of June, 1996

Attest:

BRUCE LEHMAN

Attesting Officer

Commissioner of Patents and Trademarks